United States Patent
Riedl et al.

(10) Patent No.: US 8,719,881 B2
(45) Date of Patent: May 6, 2014

(54) METHODS AND APPARATUS FOR ENABLING SYNCHRONIZED CONTENT PRESENTATIONS USING DYNAMICALLY UPDATED PLAYLISTS

(75) Inventors: Steven Riedl, Superior, CO (US); Bryan Santangelo, Sand Springs, OK (US); Craig Mahonchak, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 500 days.

(21) Appl. No.: 12/036,404

(22) Filed: Feb. 25, 2008

(65) Prior Publication Data
US 2009/0217329 A1    Aug. 27, 2009

(51) Int. Cl.
*H04N 7/173* (2011.01)
*G06F 15/16* (2006.01)

(52) U.S. Cl.
USPC ............ 725/93; 725/86; 725/97; 725/103; 709/231; 709/232

(58) Field of Classification Search
USPC .......... 725/80, 86, 88–89, 102, 135; 709/204, 709/248, 231
See application file for complete search history.

(56) References Cited

U.S. PATENT DOCUMENTS

| | | | |
|---|---|---|---|
| 7,114,172 B2* | 9/2006 | Lord | 725/80 |
| 7,669,219 B2* | 2/2010 | Scott, III | 725/89 |
| 7,716,376 B1* | 5/2010 | Price et al. | 709/248 |
| 2006/0116139 A1* | 6/2006 | Appelman | 455/466 |
| 2007/0273338 A1* | 11/2007 | Anschutz | 709/204 |
| 2008/0162712 A1* | 7/2008 | Fu et al. | 709/231 |

OTHER PUBLICATIONS

The OCAP PRimer—The Gateway to INteractive Content—Published by Interactive TV Works—Copyright 2006 ( Authors : Craig Leddy and Leslie Ellis).*

* cited by examiner

*Primary Examiner* — Hai V Tran
(74) *Attorney, Agent, or Firm* — Straub & Pokotylo; Michael P. Straub; Stephen T. Straub

(57) ABSTRACT

Methods and apparatus for allowing parties, e.g., individuals, at different locations to participate in an on-demand content delivery session are described. Dynamically updateable playlists are used to control content delivery to the session participants in a synchronized manner. Content may be delivered to different session participants from different servers with a different playlist corresponding to each session participant being used to control content delivery to the session participant's host platform, e.g., set top box. Either party may update the playlist with, optionally, each of the content delivery servers being controlled by a different or local copy of the jointly updateable play list. Thus, an inviting party and one or more joining parties are able to participate together in an on-demand session. While the participants may be served by the same or different content delivery servers, the parties are able to share images, audio, and/or video in a synchronized manner.

18 Claims, 7 Drawing Sheets

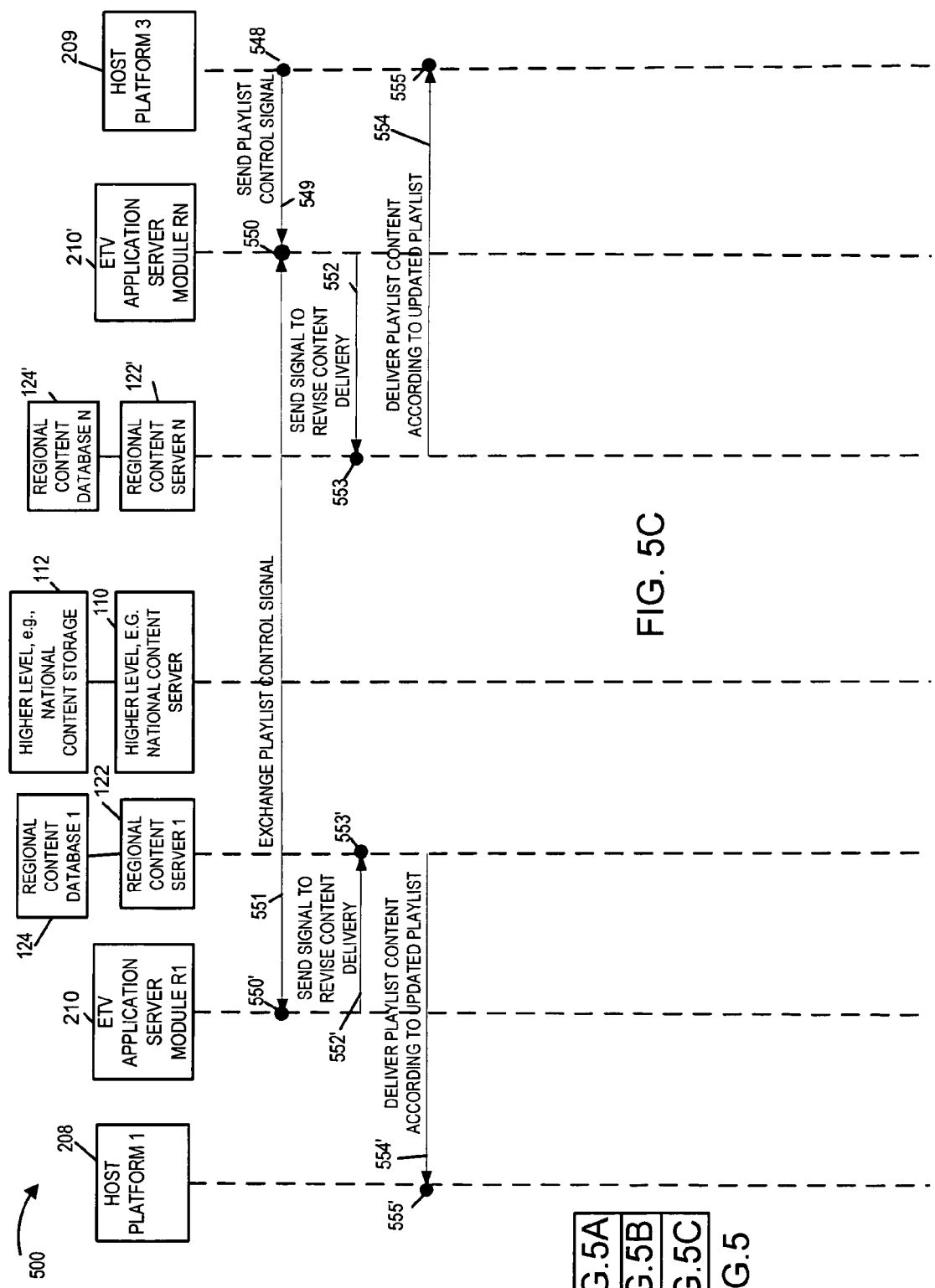

METHODS AND APPARATUS FOR ENABLING SYNCHRONIZED CONTENT PRESENTATIONS USING DYNAMICALLY UPDATED PLAYLISTS

RELATED APPLICATIONS

The present application hereby expressly incorporates the entire content of U.S. patent application Ser. No. 11/953,179, filed on Dec. 10, 2007, titled "APPARATUS AND METHOD FOR VIDEO-ON-DEMAND PLAYLIST" and which names as an inventor at least one inventor named on the present application.

FIELD OF THE INVENTION

The present invention relates to synchronized content presentation methods and apparatus, and, more particularly, to methods and apparatus for enabling synchronized content presentations to a plurality of users using dynamically updated playlists, e.g., as part of a synchronized content delivery process.

BACKGROUND OF THE INVENTION

Media content delivery systems often provide a combination of basic and premium services. Basic services may include a standard package of broadcast television channels while premium services may include Video on Demand (VOD) services where a subscriber may select premium content, e.g., a recent movie or sports event, to be delivered for viewing. Upon selection of VOD content, the content is supplied to customer premise equipment, e.g., a set top box at the subscriber's residence. While many VOD systems are directed to supplying premium content, some VOD systems, including Network Personal Video Recorders (Network PVRs), also sometimes called Network Digital Video Recorders (NDVRs), allow a user to store content, e.g., personal photos, video images, etc. and/or other content on a network storage device and retrieve the information, e.g., for display, on demand. As VOD and Network PVR technology advances, there is a need for new services and methods of using the technology to justify the cost of continuing development and the cost of adding ever greater functionality and storage capacity to the systems.

Existing VOD servers used by the cable industry today tend to support standardized protocols which can be used to control the delivery of ordered content. Examples of such protocols include the ISA protocol suite which is part of the Interactive Services Architecture that was developed for cable companies with the purpose of supporting VOD services. These particular protocols are generally referred to as ISA protocols and include a Lightweight Streaming Control Protocol (ISA LSCP), ISA Session Set Up protocol (ISA SSP) and various other ISA protocols. ISA protocols are described at www.interactiveservices.org. Time Warner Cable's Session Setup Protocol (SSP) Version 2.3 dated May 19, 2003 and Lightweight Stream Control Protocol (LSCP) Version 1.1 dated Sep. 5, 2003 which are available at the www.interactiveservices.org website are both hereby expressly incorporated by reference in their entirety. Additional information on ISA Lightweight service protocols is provided in: 1) the LSCP Implementation Specification Version 1.0 dated Apr. 12, 2004 (TWC-LSCPI-SP-1.0); 2) CableLabs Video-On-Demand Content Specification 1.1 (MD-SP-VOD-CON-TENT1.1-I03-040107 dated Jan. 7, 2004 and 3) CableLabs Asset Distribution Interface Specification Version 1.1 (MD-SP-ADI1.1-I03-040107 dated Jan. 7, 2004 each of which is hereby expressly incorporated by reference in their entirety. A derivative system which uses ISA commands to implement VOD functionality which is also used by many cable companies is the OpenStream system described at www.tandbergtv.com which is an on-demand digital service platform and related protocols that allow cable operators to provide on-demand video services. These cable industry standards are used to provide the backend management functions and interface/APIs for many VOD systems currently in use by the cable industry today. Backend management functions may include such things as, session set up, controlling delivery authorization for users, network personal video recorder (NPVR) functions, and billing functions. Control of delivery may include supporting one or more NPVR features, in response commands received from a customer premise equipment (CPE) device.

Recent advances in broadband network used to deliver IP packet streams and IP devices, such as personal computers, personal digital assistants (PDAs), etc. have opened up new opportunities for the delivery of content, e.g., video on-demand. IP devices often rely on Real Time Streaming Protocol (RTSP) signaling to control on-demand streaming. RTSP is a client-server multimedia presentation control protocol, designed to address the need for efficient delivery of streamed multimedia over IP networks. RTSP is described in the Internet Society's Network Working Group Request for Comments (RFC) 2326 dated 1998 which is hereby expressly incorporated by reference in its entirety.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, one known DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

U.S. Pat. No. 7,073,189 of McElhatten, et al. is entitled "Program guide and reservation system for network based digital information and entertainment storage and delivery system." The disclosure of the aforesaid U.S. Pat. No. 7,073, 189 of McElhatten, et al. is expressly incorporated herein by reference for all purposes. A "network PVR (NPVR)" (also sometimes referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Note that a NDVR can be distinguished from a DVR in that the latter, storage of programs and the like is limited to being local to the DVR, while in the former (NDVR) case, storage is available at the server or head end level where such storage normally occurs in the case of a NDVR. However, it should be appreciated that in NDVR systems some local content storage may also be supported but that such content storage tends to be more limited than that available on the network.

US Patent Publication 2004/0103429 A1 of Carlucci et al. is entitled "Technique for delivering entertainment programming content including commercial content therein over a communications network." The disclosure of the aforesaid US Patent Publication 2004/0103429 A1 of Carlucci et al. is expressly incorporated herein by reference for all purposes. The Carlucci et al. publication discloses that although personal video recorders (also known as digital video recorders) provide certain conveniences to viewers of programming content, such devices facilitate manipulation or "skipping" of commercials, frustrating the intent of the advertisers of the commercials. In accordance with the Carlucci et al. invention, when a user fast-forwards (or rewinds) a commercial, alternate commercial(s) may be accessed for display in place of the original commercial, which provides a full impression of the goods and service promoted, otherwise impossible to appreciate at the fast-forward (or rewind) speed. The duration of the alternate commercial(s) corresponds to the duration of the original commercial at the fast-forward (rewind) speed controlled by the user. With the Carlucci et al. invention, the user advantageously realizes the convenience of manipulating programming content, and at the same time can appreciate the full impression of an alternate commercial to the original commercial, albeit in a shorter duration.

US Patent Publication 2005/0060745 A1 of Riedl et al. is entitled "System and method for advertisement delivery within a video time shifting architecture." The disclosure of the aforesaid US Patent Publication 2005/0060745 A1 of Riedl et al. is expressly incorporated herein by reference for all purposes. The Riedl et al. publication discloses systems and methods for creating a program for delivery to a client in a video time shifting architecture. The system of the Riedl et al. invention includes an advertisement selection system (ADS) operative to select one or more advertisements and transmit one or more identifiers that uniquely identify the selected advertisements and an advertisement management system (AMS) operative to generate a playlist that identifies content. The playlist includes a user requested time shifted program and the one or more selected advertisements. A video server is operative to interpret the playlist and deliver the content to the user.

While various VOD, including NPVR systems exist, there use tends to be a personal one with a user requesting and/or otherwise retrieving content and view the content at their premises. It would be desirable if new methods could be developed which allowed VOD systems to be used in a more communal or social manner. For example, it would be desirable if a VOD user could invite another party, e.g., another user such as a friend or relative, to join in a VOD experience. It would be desirable if such an invitation to join the VOD session could be extended even in cases where the party to be invited was located at a different physical location, e.g., a different customer premise from the user initiating the VOD session. To further facilitate the communal experience, it would be desirable if methods and apparatus could be developed which would allow both an inviting party and invited party to control a VOD session in which they are jointly participating even though each party may be having the content supplied by a different server.

SUMMARY OF THE INVENTION

Methods and apparatus for allowing parties, e.g., individuals, at different locations to participate in an on-demand content delivery session, e.g., an on-demand VOD session, are described. In various embodiments, an inviting party and one or more joining parties are able to participate together in an on-demand session. While the participants may be served by the same or different content delivery servers, in accordance with the invention, the parties are able to share images, audio, and/or video as part of a synchronized real time experience. The synchronized presentation and control experience promotes a sense of community and social connectedness despite the individuals involved in the experience being located at locations which may be geographically separated from one another.

In various embodiments, the methods of the present invention take advantage of a network with distributed content servers to provide content to user devices, e.g., set top boxes, which can be used to control a playback experience and to communicate with other users. In accordance with one exemplary embodiment, a user at one location which is being presented material from a playlist can invite another user to join in experiencing, e.g., viewing, and controlling the presentation. Assuming the second user accepts the invitation, a server which is responsible for providing content to the second user is configured to present content to the user in a synchronized manner with the content being presented to the first user. Content delivery to the invited and inviting party may, and sometimes is, controlled by different playlists which may be copies or synchronized versions of one another.

Peer to peer signaling may be used for communication between the devices, e.g., servers, responsible for managing the playlists used to control content delivery to the devices of session participants. Users can interact with the servers causing the playlists used to control content delivery to be updated in a synchronized manner.

In some embodiments, the synchronized playback is achieved by the user devices participating in the synchronized playback session signaling a local server to update a playlist and modify the play list in response to one or more user commands. In this manner, a continuing presentation may be presented to the user with changes in the presentation being implemented via changes being made to the individual playlists used to control the presentation being made to each of the end users. Updating of the playlists in a dynamic manner may, and in some embodiments is, implemented using the dynamic playlist updating methods described in related U.S. patent application Ser. No. 11/953,179 titled: "APPARATUS AND METHOD FOR VIDEO-ON-DEMAND PLAYLIST which is being filed on Dec. 10, 2007 which is expressly incorporated by reference in its entirety.

The methods and apparatus of the invention may be used to synchronize playback of photos, music, video and/or a host of other types of possible content with the users participating in the synchronized playlist experience sharing control over the presentation. This provides a sense of community as the shared playback experience proceeds. The methods and apparatus of the invention are well suited for implementation on a cable or other type of network which supports interactive connections and the ability to present the content of playlists on demand.

While described in the context of a system where participants are served by remote, e.g., separate regional content servers, it should be appreciated that the methods and apparatus can be used to support a shared playback experience for users serviced by the same regional server or a combination of users some of which are serviced by the same regional server while others are serviced by a different regional server. Content not initially available at a particular regional server may be obtained from a higher level content server, e.g., national content server or by one regional server communicating the content to the other regional server so that the two regional servers can supply the content to the end users in the different regions at the same time. In some embodiments, delays in content availability result in modifications of one or more playlists so that the content will be provided to the participants in a synchronized manner. In some cases this involves updating the participant's playlists so that they are shown other content while the content is made available to the servers corresponding to one or more participants of the session. Thus, while one participant may be able to begin receiving content before other participants, the playlists used to control delivery to the various participants are updated and managed so that content delivery occurs in a synchronized manner. In cases where content is readily available, changes by one participant to the play list controlling content delivery to the participant are reflected in the playlists used to control content delivery to other participants of the same session. Thus, real time or near real time changes, e.g., fast forward, reverse, skip and/or content selection changes, can be made with many or all of the participants of the content delivery session experiencing the changes made by another participant.

Various additional features and advantages of the present invention are discussed in the detailed description which follows.

DETAILED DESCRIPTION

As discussed above, the present invention relates to synchronized content presentation methods and apparatus, and, more particularly, to methods and apparatus for enabling synchronized content presentations using dynamically updated playlists, e.g., using a plurality of servers. The content presentations may be presentations of audio, video, still pictures or a variety of other types of content.

Figure 1:
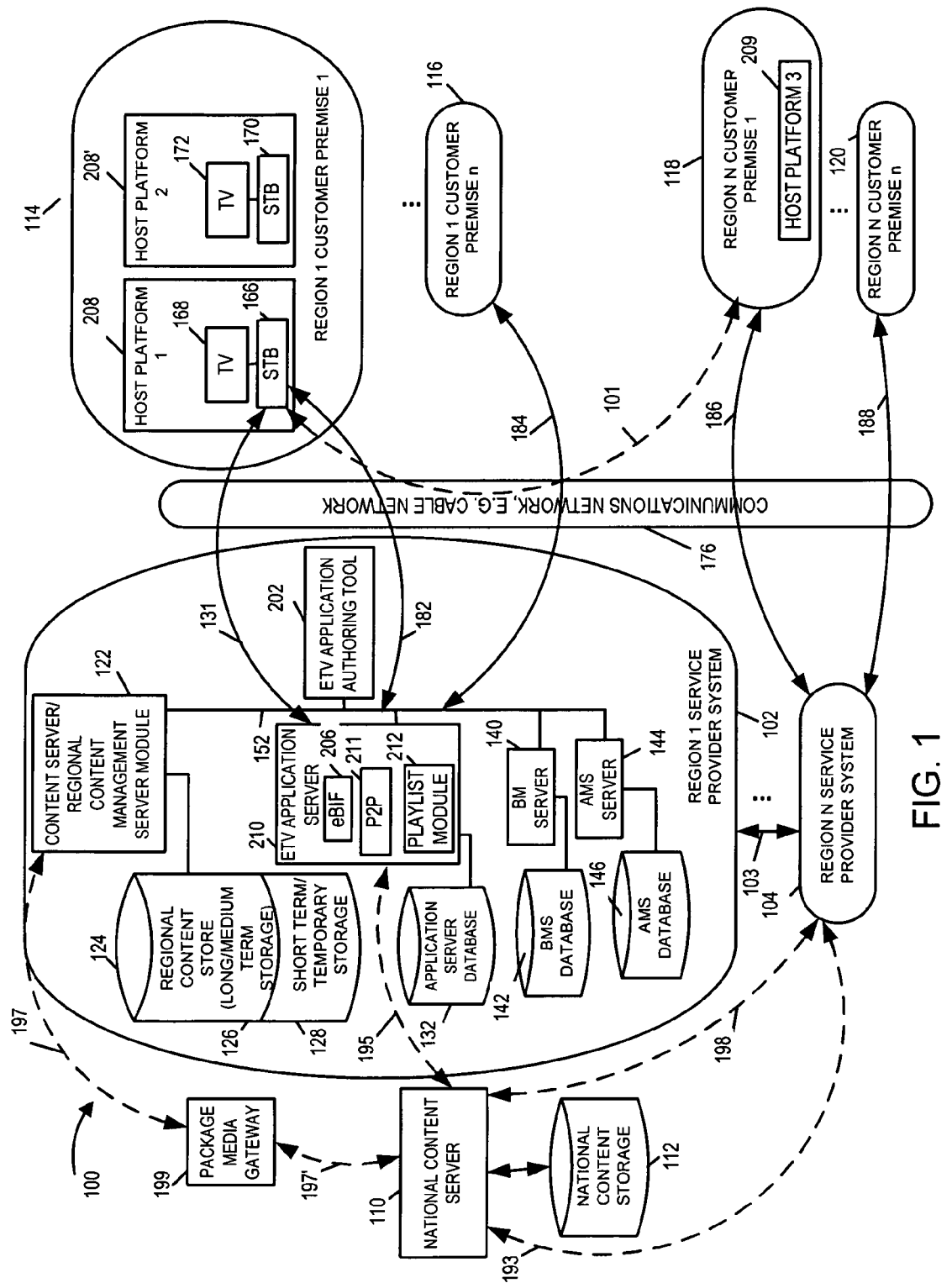
FIG. 1 illustrates an exemplary communication system implemented in accordance with the present invention.

FIG. 1 illustrates an exemplary content delivery and distribution system 100 supporting the provisioning, selection, notification, communication, and billing of content, e.g., content including video on demand (VOD), to customers in accordance with various embodiments of the present invention. Exemplary system 100 includes a plurality of N regional service provider systems including a region 1 service provider system 102 and a region N service provider system 104. Each regional service provider system, e.g., region 1 service provider system 102, region N service provider system 104, has a corresponding set of customer premises region 1 customer premise 1 114, . . . , region 1 customer premise n 116, region N customer premise 1 118, . . . , region N customer premise n 120. System 100 also includes service provider national infrastructure including a national content server 110 with a corresponding national content storage 112.

Region 1 customer premise 1 114 includes a first set of equipment, e.g. Host Platform 1 208 including a television 168 and a set top box (STB) 166. While the host platform 208 is described as including both the STB 166 and television 168, host platforms can be implemented with the STB 166 without the television. In such embodiments, the STB 166 is coupled to a display device or an external television as is commonly the case. Accordingly, references to host platforms in this application should not be interpreted as requiring a device which includes a display. Region 1 customer premise 1 114 also includes additional Host Platform 2 208' including television/set top box pairs (172, 170). Some customer premises include at least one set top box and at least one television. Some customer premises include at least one device supporting a customer Web browser. At least some customers in the system 100 have accounts with the service provider which can be accessed via a Web browser, situated at the same location or a different location from the customer's set top box, and input/output interfacing performed via the Web browser can affect content availability via the customer's set top box interface and/or can be used to provide information about friends or other individuals with whom the user of the STB at the customer premise may wish to establish a synchronized communications session with at some point in the future via the STB 166.

Region 1 service provider system 102 includes a content server/regional content management module 122, an Enhanced Television (ETV) application server 210, a business management (BM) server 140, and an Accounting management server (AMS) 144. The ETV application server includes an enhanced television binary interchange format (eBIF) communications and control module 206, a Peer to Peer (P2P) signaling module 211 and a playlist module 212. The P2P module 211 can be used to exchange signals and playlist information with one or more ETV application servers, e.g., corresponding to other service regions, as part of establishing and maintaining a synchronized multi-party VOD session in accordance with the invention. The playlist module 212 can be used for generating a playlist in accordance with the invention. The playlist is used to control the supply of video content to a user of a host platform 208. As will be discussed below, playlist information is dynamically updated and shared between ETV application servers 210 serving different parties who join a synchronized VOD session in accordance with the present invention. Playlist module 212 can create, update and supply all or part of a playlist to another ETV application server as part of the VOD session synchronization process which will be discussed further below. ETV application server 210 is capable of interacting with the content server 122 to see that content is provided, e.g., streamed, to the host platform being served by the ETV application server 210 in accordance with a playlist created and/or updated as part of a VOD session, e.g., in accordance with the invention.

In addition to the above discussed elements, region 1 service provider system 102 also includes a plurality of various databases (e.g. regional content storage 124 coupled to content server/Regional content management module 122, application server database 132 coupled to ETV application server 130, business management server database 142 coupled to business management (BM) server 140, and Accounting management server (AMS) database 146 coupled to AMS server 144. The various servers (122, 140, 144, 210) are coupled together via a bus 152 over which they may interchange data and information.

Region 1 customer premise 1 114 is coupled to region 1 service provider 102 via a communications network 176, e.g. a cable or fiber optic network. Communications link 182 traversing the service provider's cable network 176 couples set top box 166 to the region 1 service provider's bus 152. Similarly, region 1 customer premise n 116 is coupled to region 1 service provider system bus 152 via link 184 which traverses service provider cable network 176.

Region N customer premise 1 118 is coupled to region N service provider system 104 via a communications link 186. Similarly, region N customer premise n 120 is coupled to region N service provider system 104 via a communications link 188.

Region 1 service provider system 102 is coupled to region N service provider system 104 via link 103. Each of the regional service provider systems (102, 104) are also coupled to the national content server 110. Link 193 indicates that region N service provider system 104 is coupled to national content server 110.

National content server 110 is coupled to Content server/Regional content management module 122 by way of links 197', a package media gateway 199 and link 197. The package media gateway 199 can be used in the delivery and/or exchange of content between the national content sever 110 and regional content server/regional content management server module 122. The National content server 110 is also coupled to the ETV application server 210 via link 195. Similarly national content server 110 is coupled to a Content server/Regional content management module and an ETV application server of region N service provider system 104 via links (193, 198), respectively. A package media gateway may be included on link 198 in the same or similar manner that a package media gateway is included on link 197. Various alternative interconnection topologies between the regional service provider system and the national service provider infrastructure are possible.

National content storage 112, typically has a greater storage capacity than the storage capacity of an individual regional content storage, e.g., region 1 regional content storage 124. Regional content storage 124 includes long/medium term storage 126 and short term/temporary storage 128. Long/medium term storage 126 includes, e.g., content storage of programs such as movies for which there is a high degree of anticipated demand. Long/medium term storage 124 includes, e.g., content of recent releases, content of regional favorites, content of seasonal favorites, etc. Short term/temporary storage 128 includes storage of content of infrequently selected programs which do normally reside in storage 124, e.g., a customer ordered video on demand infrequently selected movie that has been recently downloaded from national content storage 112. Short term/temporarily storage 128 also includes storage of time sensitive programs, e.g., a recent weather report, a recent news report, etc. Individual program content stored in short term/temporary storage 128 may, and sometimes does, have a cache time associated with maintaining the program content. One or more portions 126, 128 of the regional content store may be used to store personal images or other user specific content. This content can be accesses as part of a user initiated on-demand session to which, as will be discussed below, an initiating party can invite others to join. The synchronized on-demand sessions made possible by the present invention are not limited to personal or user specific content and can be implemented using content available in one or more of the regional content stores 124 and/or the national content store 112.

Host Platform 1 208 in Region 1 customer premise 1 114 can interact with other host platforms, e.g., directly using P2P signaling in some embodiments, or through communications via the ETV application server 210 as will be discussed below. P2P signaling link 101 between the host platform 3 209 of region N and the host platform 208 Host Platform 1 208 is shown using dashed lines since this link is optional and not used when the communication between the host platforms is indirect, e.g., via the ETV application servers 210 in each of the regions 1 102 and N 104 which can be used to communicate invitations to join a session and response signals. In the exemplary system shown in FIG. 1, the Host Platform 1 in region 1 customer premise 1 comprises the set top box, i.e. STB 166 which interacts with the ETV application server 210 for supporting customer access to service provider program content availability information, customer ordering of content, reporting of status of ordered content, and customer account management functions. It also includes the TV 168 but as noted above, this is optional. Interaction between the STB 166 and the ETV application server 210 enables the Host Platform 1 208 to initiate an interactive session with a user of another host platform, e.g., host platform 3 209. Thus, a user of host platform 208 can initiate an on-demand VOD session, e.g., by making a selection and signaling the ETV application server to initiate a session and then signal that an invitation is to be extended to a user of another host platform to join the session. The invited user may be a buddy, friend, relative or any other party the user of host platform 1 may seek to invite to join an on-demand session. The invited user may be a subscriber of the same operator of system 100 or may be a subscriber of a different operator that allows access to its application servers. In some embodiments, the user of the host platform 208 provides buddy information prior to trying to initiate a session and this information is then accessed by the set top box and/or ETV server to provide a list of possible users who can be invited to join. Different avatars, e.g., images, can be associated by the user with each of the different buddies with the user selecting from a list of displayed avatars when identifying to the ETV server who should be invited to join a session. The ETV server 210 stores the buddy list information and information indicating the ETV application server 210 serving each individual in the buddy list and what region in which they are located A subscriber, e.g., user of a host platform, may view lists, information, menus, trailers, etc. of available content, initiate searches based on key information, view search results, select a video on demand program, place an order for the selection, receive an indication of an approximate time of availability for viewing, and receive an indication, e.g., a notification message when ordered content is available for viewing.

National content server 110 interacts with the regional servers, e.g., content server/Regional content management server module 122, and the ETV application server 210. For example, a user or customer may request a video or some program from its regional content server via a signal sent to the ETV application server 210. The content may or may not be available locally within the Content server/Regional content management server module 122. In cases where the requested content is not available locally to the regional server, the national content server 110 receives request for customer program orders for content relayed from the Content server/Regional content management server module 122 which was unable to satisfy the request using locally stored content. The Regional content management server module 122 forwards the request to the National content server 110 along with information identifying the regional store to which the requested content is to be directed. The National content server 110 then forwards a content delivery time estimation information and/or content delivery information to the Regional content management server module 122, which sends this time estimation to the end user or customer either directly or via the ETV application server 210. In some, but not necessarily all embodiments, a user may directly receive the requested program, e.g. a movie from the National content server 110.

National content server 110 calculates estimated delivery time for requested content, e.g., based on system topology information, network metrics and/or historical data transfer rates. In some embodiments national content server 110 tracks content storage of at least some information in regional stores and considers a transfer between regional stores as an alternative to a transfer from national content storage 112 when responding to a request for content not currently available at a customer's corresponding regional content store. National content server 110 processes requests for content and accesses content from national content storage 112, e.g., forwarding requested content via link 197 to Content server/Regional content management server module 122 for storage in short term storage 128 of regional store 124. The national content server 110 also communicates information, via link 195, such that the ETV application server 210 can update the application server database 132 and playlist corresponding to requested content. The communication to the ETV application server may identify the requested content, e.g., ordered movie, video claim, etc, indicate that it has been loaded in the regional store and/or indicate the time it will be available for delivery to the user platform. Based on received information, the ETV application server 210 can update a user's play list and also communicate content availably information to other ETV application servers 210 so that playlist of different users participating in an on-demand session can be synchronized with content being provided to different host platforms corresponding to different users from one or more content stores in a synchronized manner.

Content server/Regional content management server module 122 manages regional store 124, e.g., loading a copy of an externally stored program into short term/temporary storage 128 and outputting customer ordered and/or purchased content for delivery to a set top box. The externally stored program content, which was copied, may also be stored in national content store 112. Other functions performed by Content server/Regional content management server module 122 include deleting and/or not maintaining content accessibility in response to a received command and/or to the expiration of a timer.

ETV Application server 210 is responsible for enabling interactive on-demand sessions in which multiple users can participate in a synchronized and interactive manner. Among other functions, the ETV application server 210 is responsive to a request to initiate a VOD session and provides a VOD session participant the opportunity to invite others to join the on-demand session and to allow synchronized control of the session, e.g., by multiple participants located at different customer premises. eBIf signaling supported by the eBIF communications and control module 306 may be used to facilitate presentation of user options and responses to invitations to join a content delivery session. Thus, among other things ETV application server 210 is responsible, in some embodiments, for establishing and maintaining a multi-party content delivery session. This is done by maintaining one or more playlists which are updated dynamically and by generating and processing control signaling needed to control the flow of content and to synchronize content delivery to multiple different host platforms corresponding to different users who join an on-demand content delivery session. The ETV application server 210 exchanges signaling and information with the set top box user interface, which is shown by link 131 as well as ETV application servers in other regions.

As noted above, ETV application server 210 includes the P2P (Peer to Peer) signaling module 211 and the playlist module 212. The P2P signaling module 211 is responsible for signaling, e.g., which may but need not be, peer to peer signaling, between different ETV application servers at different locations and/or in different regions. The playlist module 212 generates playlist information and may include one or more stored playlists, e.g., corresponding to different host platforms. The playlist module 212 maintains and dynamically updates playlists based on input from the user to which a playlist corresponds and/or signals from other servers generated in response to control signals from other users participating in a synchronized content delivery session.

Business management server 140 processes billing information corresponding to region 1 customers, e.g., updating billing charge information in response to video on demand purchases and/or other user activity. Business management server 140 also processes bill payment information, e.g., credit card transactions, deductions from debit accounts, mail bills, and/or processes discount and/or coupon information. In accordance with the invention, a party inviting another party to join a session may, and in some embodiments is, billed for the charges associated with the invited party joining a session. In other embodiments, each party participating in a VOD session is billed for their participation in the session, e.g., by the Business management server 140 serving their region. In other embodiments, subscribers are billed on a flat rate basis with subscribers who are provided service by the same video service provider not being charged any additional fee beyond their normal flat rate service fee when they join or invite others to join an on-demand VOD session.

Figure 2:
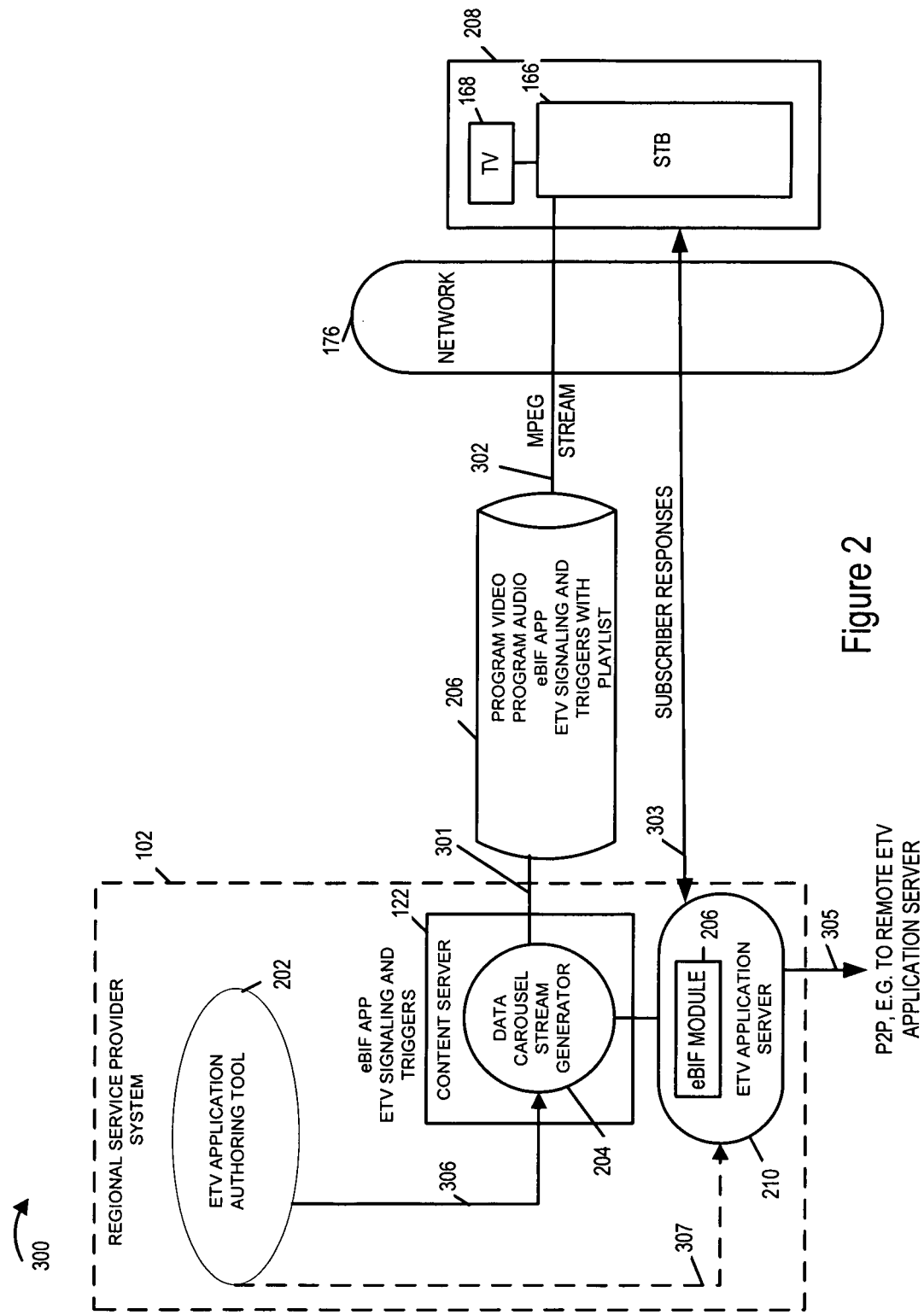
FIG. 2 is a more detailed illustration of a portion of the exemplary communications system of FIG. 1 showing the relationship of various elements in greater detail.

FIG. 2 is a more detailed block diagram illustrating a subsystem 300 of the exemplary communications system of FIG. 1. The subsystem 300 includes various elements which support and enable enhanced television (ETV) features that are employed in some embodiments of the present invention. The subsystem 300 includes regional service provider system 102, a network 176 and the host platform 208. The network 176 may be, for example, a cable, a fiber, or a hybrid fiber cable network which supports both upstream and downstream communication between the regional service provider system 102 and host platform 208. As indicated in FIG. 1, the host platform 208 includes a set top box 166 and a television 168.

The regional service provider system 102 includes an ETV application authoring tool 202, a content server 122 and an ETV application server 210. The content server 122 includes a data carousel stream generator 204 which can receive and store content obtained from the regional and/or national content server. The data carousel stream generator 204 is also able to send content to the regional/national content server as well as to STB 166. The content server 122 is coupled to the ETV application server and is able to output content corresponding to a playlist supplied by the ETV application server 210 and/or to merge eBIF signals with content being delivered to the STB 166.

Thus, from the content server 122, the STB 166 can receive an MPEG video stream 307 including, for example, a multiplex of a video program, audio program, and eBIF signals supporting ETV functionality. The eBIF signals can be used to control the presentation of prompts at one or more points within a content presentation and are generated under control of eBIF module 306. eBIF and/or other signals can be used to instruct the STB 166 how to respond to input from a user received in response to a prompt. Subscriber responses 303 to prompts, e.g., prompts providing the user of STB 166 an opportunity to invite a friend to join an content delivery session, are communicated to the ETV application server via network 176. Via the multiplexed MPEG stream 307, the ETV application server 210 can indicate responses from other users to invitations to join a session and/or other input from a user invited to join a session.

Accordingly, it should be appreciated that subsystem 300 supports eBIF functionality at the regional service provider system 102 allowing for eBIF signaling to be multiplexed with video and or other content as it passes through the content server 122 thereby providing a mechanism by which prompts can be triggered and responses returned to the ETV application server.

The ETV application authoring tool 202 can be used to create one or more applications based on ETV functionality supported by the content server 122 and/or ETV application server 210. ETV application authoring tool 202 may be located, for example, at the facility of e.g. a programmer, an advertiser within a NDVR control center, or elsewhere. In some embodiments, the ETV authoring tool is used to generate and load into the ETV server 210 control routines used to control the server 210 to implement an application such as the synchronized multi-party content delivery application discussed herein. Arrow 306 and 307 are used to indicate control routines and/or commands being communicated from the ETV application authoring tool to configure the content server 122 and ETV application server to implement an ETV application.

It should be appreciated that content server 122 may be the regional content server shown in FIG. 1 or another content server coupled to the regional content server and/or national content server. While shown as a separate server in the FIGS. 1 and 2 embodiments, it should be appreciated that ETV Application server 210 may be implemented as part of the AMS 144 or one of the other servers present in the system of FIG. 1.

Figure 3:
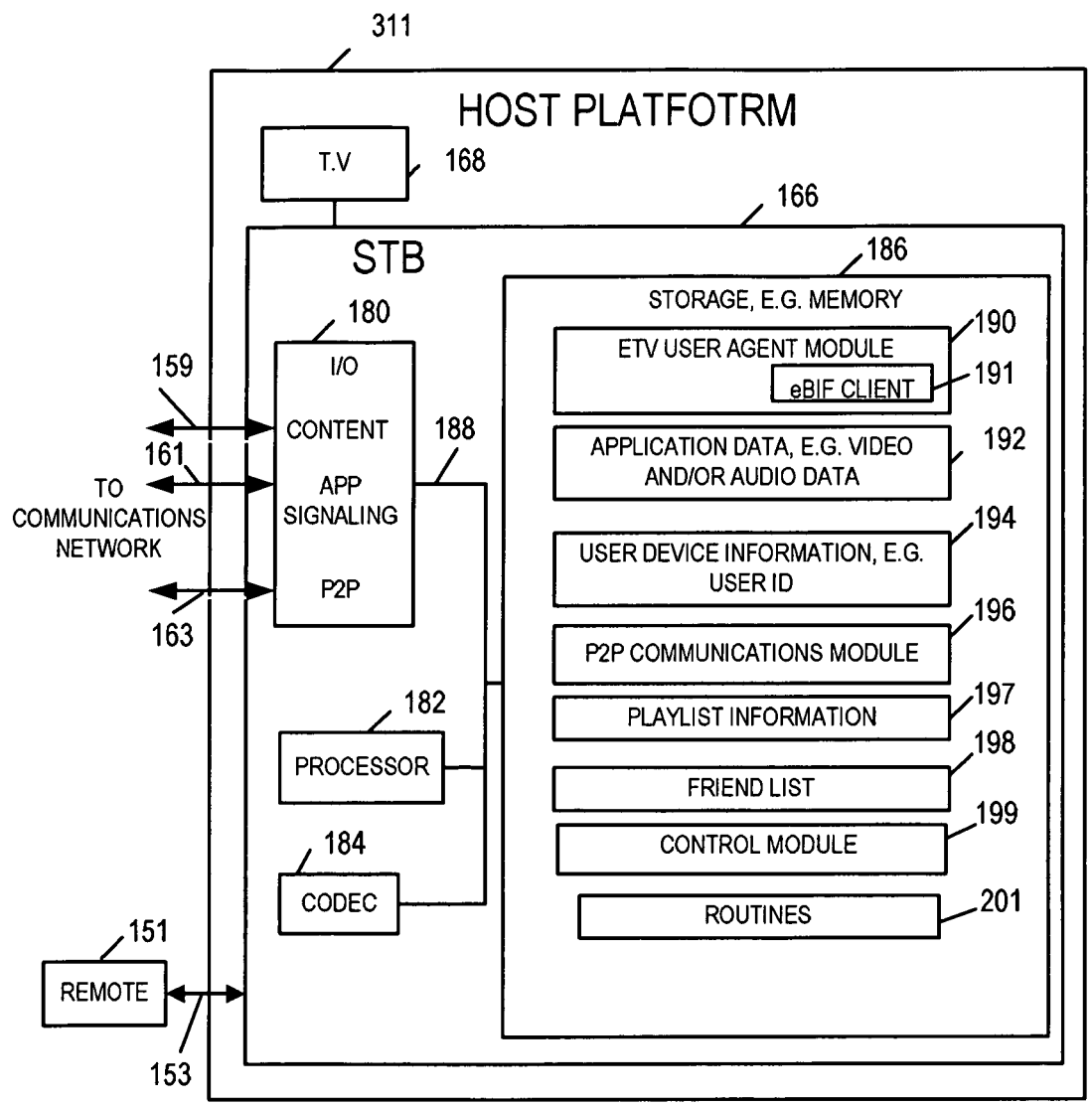
FIG. 3 illustrates an exemplary host platform which may be used in the exemplary communications system of FIG. 1.

FIG. 3 illustrates an exemplary host platform 311 implemented in accordance with one exemplary embodiment. The exemplary host platform 311 may be used as any one of the host platforms 208, 208, 209 of the system shown in FIG. 1. The host platform includes a Television (TV) 168 and a Set Top Box (STB) 166, which is accessible by the customer. As noted above, the host platform may be coupled to a display device and may not include the TV 168. The STB 166 includes an Input/Output (I/O) interface 180, a processor 182, a codec (Coder/Decoder) 184, and a storage device, e.g. a memory 186 coupled together via a bus 188. The various elements of the host platform 311 can exchange data and information over the bus 188. Via the I/O interface 180, the STB 166 can exchange signals and/or information with other devices such as the ETV server 210 via the communications network 176. The I/O interface supports the receipt and/or transmission of content to/from different servers, e.g., the ETV server 210 and/or national content server 110 and/or regional content management server 122 as represented by arrow 159. In addition to supporting the communication of content I/O interface 180 further supports the communication of application and/or control signals between the set top box 166 and other servers, e.g. ETV applications server 210 as represented by arrow 161. The I/O interface 180 may also support the exchange of P2P signaling, e.g. signaling between set top boxes, in embodiments which such direct communication is supported. In several embodiments, P2P signaling between STBs is not supported and the signaling between the STBs occurs by way the ETV servers, e.g. ETV application server 210, serving the individual STBs seeking to establish a synchronized multi-party content delivery session.

The processor 182, e.g., a CPU, executes routines 201 stored in the memory 186 and, under direction of the routines 201, controls the STB 166 to operate in accordance with the invention. To control the STB 166, the processor 182 uses information and/or routines including instructions stored in memory 186. The Codec 184 is implemented as a module and is capable of performing encoding and/or decoding operations on a digital data stream or signal.

The memory 186 includes an ETV user agent module 190, application data 192, user device information 194, an optional Peer to Peer (P2P) communications module 196, playlist information 197, a friend list 198, control module 199 and various control routines 201. Routines 201 include communications routines and/or set top box control routines. The Playlist information 197 includes information about an active playlist being used by the user. It may indicate, for example, content to be presented and the relative order and/or time at which the content is to be presented. The playlist information 197 may be the same as, a subset of, or similar to, playlist information stored at the ETV server 210 which serves the host platform 311. The friend list information 198 includes a list of friends whom the user can invite when the user wishes to start an interactive session, avatars to be displayed rather than the friends name in some embodiments, and other information about the friend including, optionally, a set top box or other network identifier (such as telephone number) corresponding to each of the individual listed friends which can be used in contacting and/or identifying the friend in the network. The same or similar friend list may be stored at the ETV application server 210 serving the host platform 311. The friend list information 198 is editable and the user may add more friends to the list or may delete an existing friend from the list. In some embodiments, the friend list is updated via a WEB interface at the ETV server or another location in the network and then downloaded to the set top box 166.

The ETV user agent module 190 includes an enhanced television binary interchange format (eBIF) Client module 191. The eBIF Client module 191 is an interactive agent module which supports the initiating of an interactive content delivery session via communication with the ETV server 210 and which facilitates interaction with the ETV server thereby making it possible to communicate with other users and to invite them to join an on-demand content delivery session. The ETV user agent module 190, for example, control presentation of a prompt to the user of the host platform 311, providing the user an opportunity to signal that the user would like to invite one or more of his/her buddies from the friend list to join in an ongoing VOD or other type of on-demand content delivery session.

Application data 192, e.g. video and/or audio data, can be movies, songs, shows etc. that the user may have download and/or otherwise stored on his set top box. It may include content which is being temporarily stored as part of an on demand content delivery session. In some cases the application data can be deleted under user control and/or portions of the data will automatically be deleted as part of normal system management, e.g., after it is displayed. The user device information 194 may be, e.g. a user ID, Media Access Control (MAC) address, etc. and or other information stored in the set top box memory. In various embodiments, the MAC address is used for routing content and/or control signals to/from the STB 166. Thus, in at least some embodiments, the MAC address is used by the service provider to uniquely identify different set top boxes belonging to different users. The MAC address of a STB corresponding to an individual included in the friend list 198 may be associated in the list with the user's name and/or avatar to facilitate communication and identification of the user and his/her corresponding STB. The optional P2P communications module 196 includes routines and control instructions for enabling Peer to Peer communications between the user set top box 166, one or more STB's, and in some embodiments the ETV Application server 210. In some but not all embodiments, the P2P communications module 196 is able to establish communications directly between different user set top boxes, e.g. set top box 166 in Host platform 1 208 and set top box 170 in Host platform 2 208'. In this manner, a user may be invited to join an on-demand session without having to go through an ETV application server 210 to enable the invitation. Furthermore, in some embodiments, playlist synchronization information is exchanged directly between STBs through P2P signaling with each STB then initiating and/or controlling a content delivery session in a synchronized manner with the initiation/control of a content delivery session by the other STB. Content delivery and/or synchronization of content delivery is facilitated in some embodiments through the use of the package media gateway 199. The package media gateway 199 can be used in the delivery and/or exchange of content between the national content sever 110 and regional content server/regional content management server module 122. Thus, content can be delivered to one or more regional content servers 122 from a higher level server, e.g., the national content server 110 so that the content can be delivered from multiple regional servers in a synchronized manner to participants of an on-demand session located in different network regions.

Figure 4:
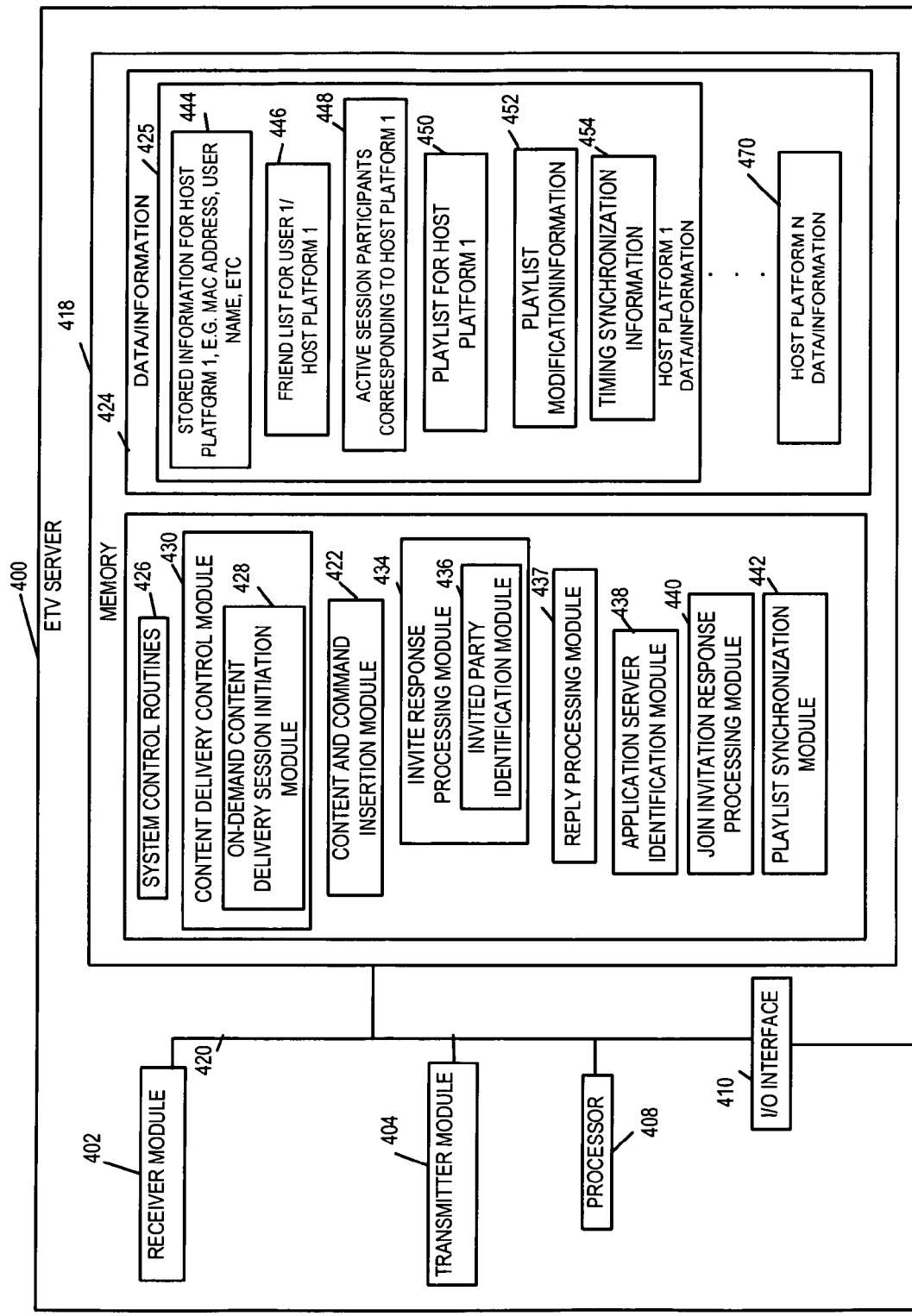
FIG. 4 shows an exemplary application server that may be used as the ETV application server shown in FIG. 1 and which can be used to implement the method of FIG. 5.

FIG. 4 illustrates an exemplary ETV application server implemented in accordance with the invention. The exemplary ETV server 400 may be used as any one of the ETV application servers of the system shown in FIGS. 1 and 2. As illustrated, the ETV application server 400 includes a receiver module 402, a transmitter module 404, a processor 408 and I/O interface 410 and a memory 418 coupled together by a bus 420. The receiver module 402 is responsible for processing messages, replies, information and/or control signals while the transmitter module is responsible for generating and sending messages, replies and information. Both the receiver module 402 and transmitter module 404 work under direction of the processor 408 which executes one or more of the routines and/or modules included in memory 418. Via the I/O interface 410, the ETV server 400 can receive and/or send content, messages, commands, etc.

The memory 418 of ETV server 400 includes system control routes 426 which control overall ETV system operation in accordance with the invention. Control routines 426 may operate in conjunction with various modules which are used to perform various functions. Modules included in the memory include a content delivery control module 430 which includes an on-demand content delivery session initiation module 428. The content delivery module 430 controls delivery of content to host platforms in accordance with on-demand requests and in response to various trick play command signals while the delivery initiation module 428 controls the start of content delivery, e.g., at the beginning of an on-demand content delivery session. The memory 418 also includes a content and command insertion module 422 which may be implemented as an eBIF module. Module 422 allows the ETV server to insert, using the eBIF or another format, information to be presented into a content stream. It can also insert commands to the STB signaling how the STB is to respond to particular user input, e.g., responses to prompts asking if friends are to be invited to join or if the user wants to join a content delivery session to which the user has been sent an invitation. The memory 418 also includes an invite response processing module 434, a reply processing module 437, an application server identification module 438, a join invitation response processing module 440 and a playlist synchronization module 442. The invite response processing module 434 processes responses to a prompt inquiring which, if any, of a user's friends the user would like to invite to join an on-demand content delivery session. The invite response processing module 422 includes an invited party identification module for identifying from information received from a user's STB, a party such a friend to which an invitation to join an on-demand session is to be sent. The invited party identification module 436 may use data/information corresponding to the host platform, e.g., STB, from which an invite response message was received and information from the friend list 446 corresponding to a host platform to identify the invited party and determine an address or server to which messages or signals can be sent to contact the invited party.

Referring now to the data/information 424 stored in memory 418, it can be seen that the memory includes a plurality of sets of information 425, 470, each corresponding to a different one of the host platforms it serves. The exemplary set 425 of information corresponding to host platform 1 includes stored information 444 corresponding to host platform 1, e.g., MAC address, user name, etc, a friend list 446, a list of active session participants indicating the participants in an ongoing on-demand content delivery session, a playlist 450 for host platform 1, play list modification information 452 indicating changes and/or other modifications to be made to maintain synchronization with playlists of other users and/or in response to trick play commands, and timing synchronization information, e.g., mutually agreed upon start times and/or other information used to maintain content delivery and presentation in a synchronized manner so that users of different host platforms who are participating in a synchronized content delivery session will be presented with content at the same or approximately the same time, e.g., within seconds or a few minutes of each other. The friend list 446 information may include information identifying friends names, avatars to be presented as a representation of the friend, MAC addresses corresponding to the platforms being used by the listed friends and/or ETV application server information identifying the friend. Thus friend list 446 includes sufficient information, which, when provided to the STB of host platform 1, enables the STB to display a list of friends who can be invited to join a session while also including sufficient information to determine an ETV or STB to which an invitation signal can be sent to invite the friend to join a session.

Referring once again to the modules included in the ETV server, it can be seen that the server also includes a reply processing module 437 for processing and taking action in response to a reply to an invitation to join an on-demand session. As will be discussed below, a response to a reply indicating that the friend has accepted an invitation to join a session, may include such actions as exchange of playlist information between an ETV server serving a host platform corresponding to the friend who is joining the session and the ETV server serving the party who initiated the invitation to join.

The memory 418 also includes an application server identification module 438 for identifying the application server, e.g., from information in Friend list 446, serving the friend being invited to join a session. The identification module 438 may, for example, determine a MAC address, which can be used to correspond with the ETV application server corresponding to a friend being invited to join a content delivery session.

The various modules and information stored in the ETV server 400 can be used to implement the methods of the present invention. Various features of an exemplary method and synchronized content delivery application which the ETV server 400 can be used to support will now be described with reference to FIG. 5.

Figure 5A:
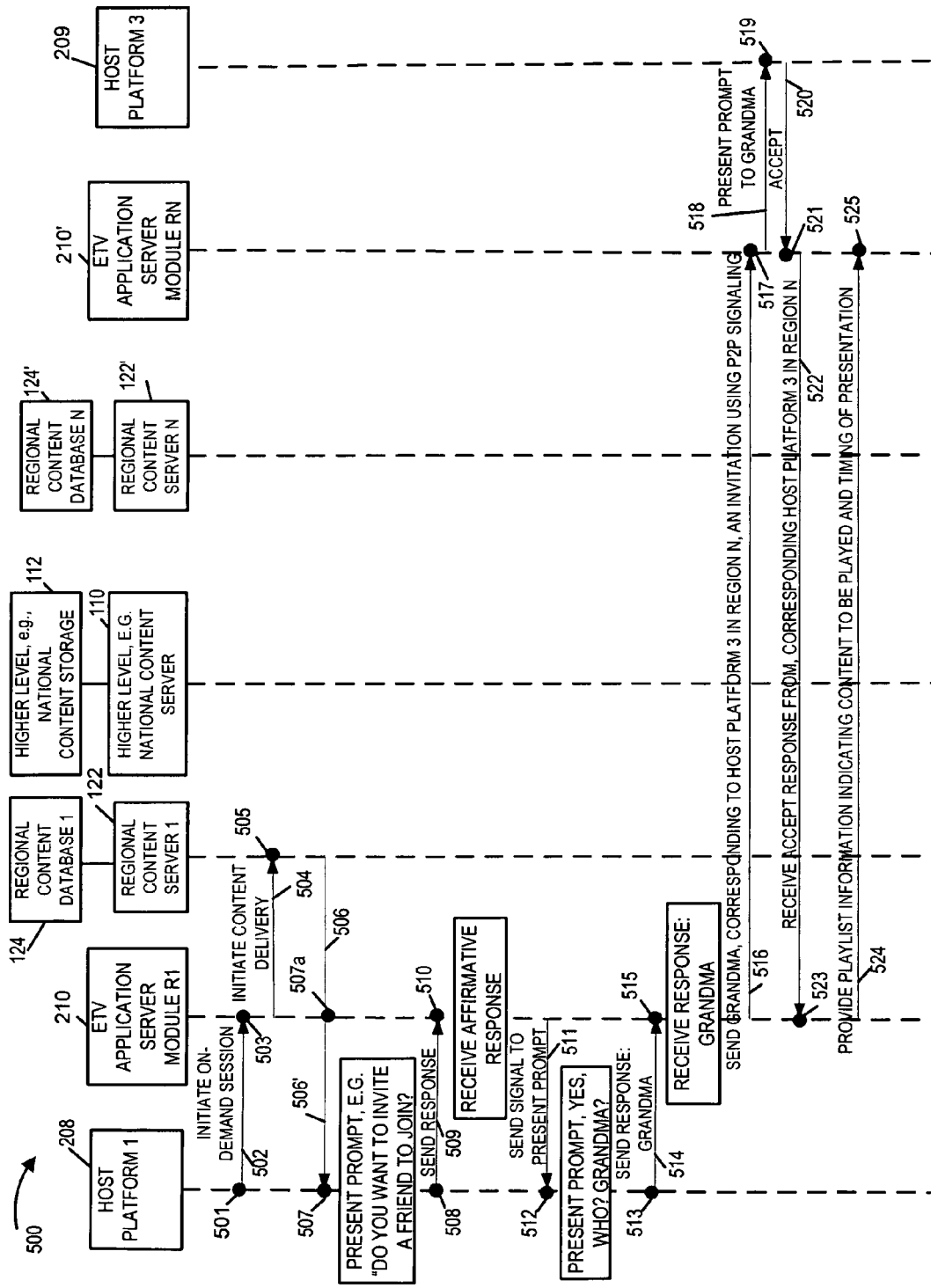
FIG. 5, which comprises the combination of FIGS. 5A, 5B and 5C, illustrates the signaling and steps associated with one exemplary content delivery embodiment where a synchronized presentation to two end user devices located in different geographical regions is supported using signaling and content delivery methods in accordance with the present invention.
Figure 5B:
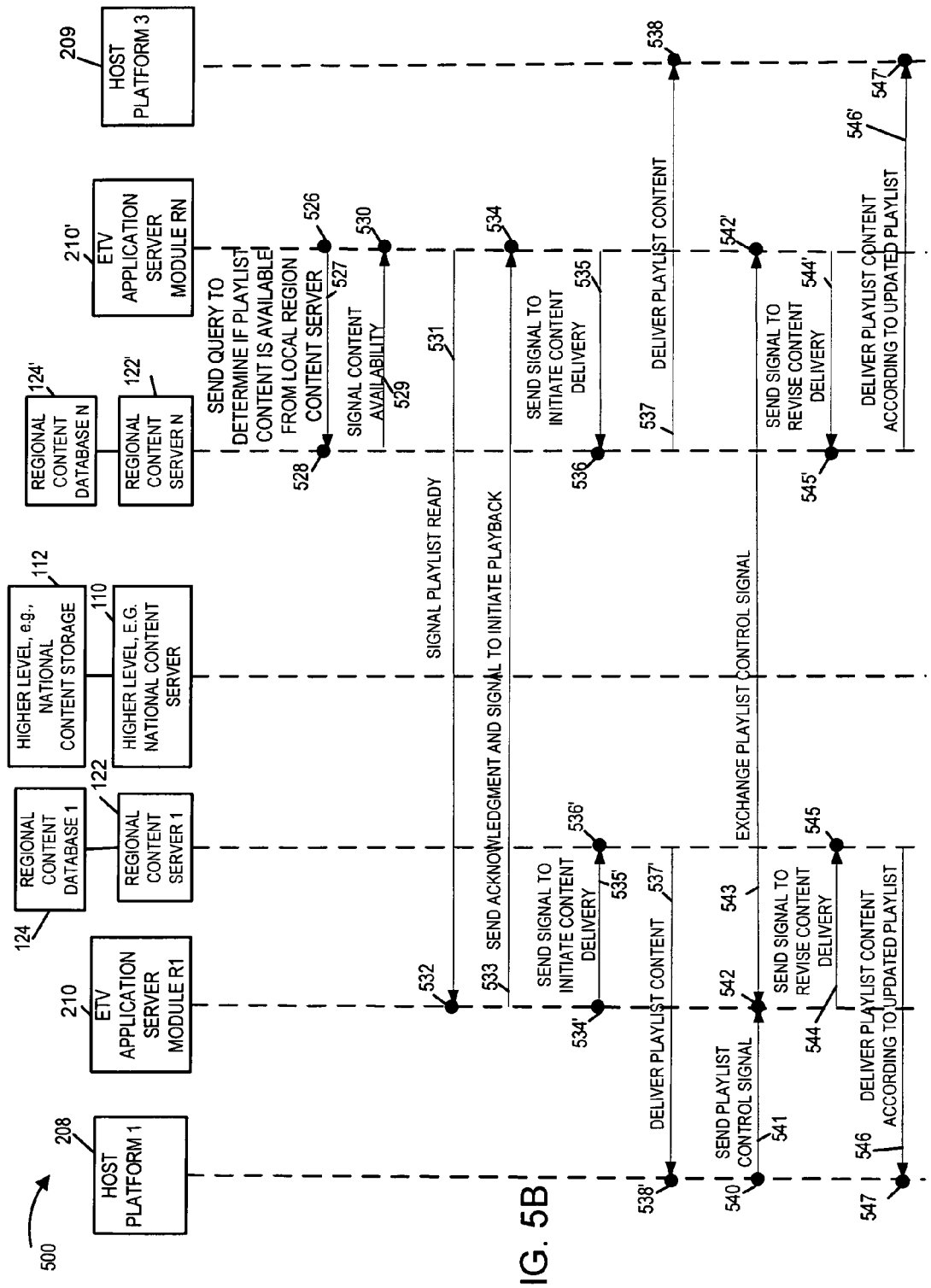

FIG. 5, which comprises the combination of FIGS. 5A, 5B and 5C, illustrates the steps and associated signaling used in one exemplary embodiment where an application allows multiple parties to be invited to join an on-demand content delivery session and to actively participate in and control the session with one or more playlists being dynamically updated in response to commands and/or selections made by participants in the synchronized content delivery session. Accordingly, while described as joining an on-demand content delivery session, it should be appreciated that a plurality of content delivery streams are established with the content being delivered and controlled in a synchronized manner to provide a joint synchronized content delivery and presentation experience that, taken as a whole, represent a joint synchronized content delivery session. The content delivery session which a party may be invited to join may be, for example, a video session or a session in which a series of pictures or still shots are displayed, e.g., in a user controlled sequence.

At the top of FIGS. 5A, 5B and 5C the various elements of the system 100 which may participate in the signaling and establishment associated with an exemplary synchronized content delivery session are shown. The illustrated components include a first host platform 208, an ETV application server 210 serving the first host platform 208, a first regional content database 124 and first regional server 122, higher level content storage 112 and a higher level, e.g., national content server 110. In addition at the top of FIG. 5A, 5B, 5C, there is also shown the regional content database for region N 124', region N regional content server 122', ETV application server 210' and host platform 3 209 which is also located in region N. Thus, it should be appreciated that first host platform 1 208 is served by the first ETV application server 210 of region 1 while host platform 3 209 is served by ETV application server 210' of region N. For purposes of this example it will be assumed that host platform 1 208 corresponds to a party seeking to initiate an on-demand content delivery session and who then seeks to invite the party, e.g., a friend, corresponding to host platform 3 209, to join the content delivery session. It is further assumed that for purposes of this example, the invited party accepts the invitation to join the session after which both parties control the session in a synchronized manner.

Thus, in the example shown in FIG. 5, a synchronized presentation to two end users, e.g., users of Host platform 1 208 and Host platform 3 209, in different regions is supported using signaling methods in accordance with the present invention.

In the FIG. 5 example, in step 501, a first user, e.g., the user of Host platform 1 208 who wishes to initiate an on-demand content delivery session, initiates an on-demand session which causes the Host platform 208 to send a request to the ETV application server module R1 210. The request may include information identifying the content to be delivered, e.g., video content, requested by the first user. The signal sent from the Host platform 1 208 to the ETV application server as shown using a signaling arrow 502. The request is received in processing step 503 by the ETV application server module R1 210 and in response to the received request, the ETV application server sends a signal 504 to the Regional content server 1 122 (e.g. Content server/regional content management server module 122 as in FIG. 1) to initiate delivery of the content (On-demand) as requested by the Host platform 1 208. This may be done in accordance with a playlist supplied in the signal from the host platform 208 to the ETV application server 210 or in accordance with a playlist generated by the ETV application server 210 in response to the on-demand initiation signal 502. In step 505, the Regional content server 1 122 processes this request to initiate content delivery, and in response provides the content 506 to the ETV application server 210 which, optionally in step 507a, inserts eBIF Triggers into the content prior to delivery to the host platform 507 as indicated by signal 506' . . . eBIF Triggers may include control information sent to the Host platform 210 which is used to cause the host platform 208 to present one or more prompts to the user thereby providing the first user an opportunity to indicate a desire to invite a friend, e.g., buddy, to join in the initiated session.

In step 507, the host platform 1 208, in response to the eBIF Trigger signaling, presents a prompt to the user, e.g. a prompt "Do You Want To Invite A Friend To Join?" As discussed above, the set top box in the host platform 208, e.g. set top box 166, includes the eBIF client module 191 which is used to control presentation of the prompt to the user on the Television screen.

Based on the result of the response to the prompt received from the user, in step 508 the host platform 1 208 generates and sends a response signal 509 back to the ETV application server 210. The response signal indicates the s decision whether or not the user wishes to invite a friend to join the session In the event, when user wishes to invite a friend to join a session, signal 509 will deliver an affirmative response from the host platform 1 208, otherwise a negative response will be received. In processing step 510, the response is processed by the ETV application server module 210. If the response is negative, steps to invite a person to join will halt. However, if an affirmative response is received the ETV application server 1 210 will generate and send another signal 511 to the host platform 1 208. In the example shown in FIG. 5 it is assumed that an affirmative response is received and that in step 510 the ETV application server generates and sends signals used to control the host platform 208 to present an additional prompt to the user, e.g. a prompt requesting the user to identify the party, e.g., buddy or friend to be invited to join the session. The prompt may be, e.g., "Invite Who? Grandma? Steve? Bill?". Rather than names, avatars corresponding to the friends who may be invited can, and in some embodiments are, displayed. Thus, this prompt provides the user, a list of friends whom he/she can invite to share in the on-demand session. In step 512, the host platform 208 presents the prompt to the user to determine whom the user wishes to invite.

The host platform 1 208 receives friend selection information from the user and generates signal 514 to communicate the selection inform to the ETV server. Signal 514 communicates the information identifying one or more friends whom the user of host platform 1 208 has selected to be invited, e.g. Grandma for purposes of this example. In step 515, the ETV application server 210 receives the response signal 514, identifies the application server and/or host platform corresponding to the invited party, e.g., using stored friend information, ant then generates and sends a signal 516, e.g., a P2P signal, to the ETV application server corresponding to the host platform used by Grandma. For example, if Host platform 3 209 used by Grandma is located in Region N customer premise 1

118, and the corresponding ETV application server (e.g. ETV application server module RN 210') is located in the Region N service provider system 104, then the P2P signal 516 will be sent to the ETV application server RN 210'. While the signal between the ETV application servers is described as a P2P signal, it should be understood that the signal could be implemented in a variety of different ways and, in some embodiments, is implemented without using peer to peer signaling but rather other messaging/signaling techniques. In embodiments where the host platform supports P2P signaling, the signal 516 may be sent directly to the host platform 209 corresponding to the party being invited. It should be noted that if the host platform 208 corresponding to the inviting party and the host platform 209 corresponding to the invited party both support P2P signaling, the host platforms may directly exchange P2P signals, e.g., inviting a party to join and accepting or declining the invitation. In some embodiments where the host platforms 208, 209 support P2P signaling, the ETV server 210 and/or content server 122 need not be contacted until after a party accepts an invitation to join the on-demand session as indicated by one or more P2P signals exchanged between the host platforms 208, 209 or by a signal exchanged between a host platform 208 or 209 and an ETV application server 210 or 210' corresponding to one of the host platforms 208, 209.

Referring again to FIG. 5A, it can be seen that the ETV application server RN 210' receives the P2P signaling from the ETV application server R1 210 and in step 517, generates and sends a signal 518 to the host platform 3 209 (host platform 3 209 being used by Grandma), causing presentation of a prompt to Grandma, e.g. a prompt "Michael Wants You Join And Share A Session With Him, Would You Like To Join?". In this example, Michael is the inviting party who was identified in signal 516 to the ETV server 210'. In step 519, host platform 3 209 receives a response from the user, i.e., Grandma, indicating whether or not the invited party wishes to join the session. In step 519 the host platform 209 sends a response signal 520 to the ETV application server 210' indicating the response received from the invited party. In this example, the invited party accepts the invitation to join the session.

The response signal 520 is received and processed by the ETV application server RN 210' in step 521 where the server 210' generates and sends a P2P signal 522 to the ETV application server module R1 210. Signal 522 informs the application server 210 that Grandma, the invited friend, accepted the invitation to join the session. In step 523, the ETV application server R1 210, in response to the received affirmative signal 522, generates and sends, another P2P signal 524 to the ETV application server module RN 210', providing information indicating playlist information, e.g., video content and, optional, scheduled presentation times, which is to be used to control the retrieval, streaming, and presentation of content to be presented as part of the content delivery session. The communicated playlist information allows the parties to share a synchronized real or near real time presentations experience. The P2P signal 524 is received by the ETV application server RN 210' in step 525 and processed.

Operation proceeds from step 525 to step 526 shown in FIG. 5B. In step 526, following receipt of Playlist content and timing synchronization information from the ETV application server R1 210, the ETV application server RN 210' generates and sends a signal 527 to the Regional content server N 122' to determine if the Playlist content is available from the local regional content server. In the event when the content is available locally, i.e. from the local regional content server, e.g. from Regional content server N 122', then the Regional content server N 122' signals content availability to the ETV application server 210' through signal 529. In the event when the Playlist content is not available locally from the Regional content server, a request to deliver the playlist content is made to the National content server 110 which will then retrieve the content from National content storage 124 and provide it to the ETV server 210' for delivery to host platform 3 209 at the appropriate time. In some other embodiments, ETV application server corresponding to a regional service provider whose Regional content server does not have the Playlist content locally available, may request that the playlist content be delivered to the ETV server 210 from another Regional content server 122 which has the content available. As a result of the need to retrieve playlist content from another regional or national server, content delivery may be delayed to host platform 3. In the case of a delay, a signal would be sent from ETV application server 210' to ETV application server 210 indicating the delay and its expected duration. The playlist used to control content delivery to host platform 1 and host platform 3 is modified to take into consideration the content delivery delay with the presentation being paused or alternative content being displayed to the users of the platforms during the delay period. Using eBIF and/or other methods of signaling the inviting party and invited party may be notified of the delay.

It should be appreciated that prior to sending a playlist to ETV application server 210', ETV application server 210 may have carried out a similar content availability determination process to determine availability of content at the ETV server 210 and/or regional server 122.

The ETV application server 210 may calculate delivery times and/or delays based on destination, alternative potential sources, network metrics and historical data transfer rates. At some times the requested content, e.g., the requested movie, resides at multiple locations in the system 100. For example, a request movie may reside in the national content store 112 and in a regional content store which is in a different region than the region in which the customer resides. For some requests, the ETV application server, e.g. ETV application server 210 or ETV application server 210' may determine that requested content can be delivered quicker by controlling the transfer of the requested content from one regional content store to another regional content store rather than by transferring content from the national content storage 112 to the customer's regional content store.

For purposes of further explaining the invention, it is assumed that the regional content server 122' indicates in signal 529 that the requested content is available for delivery, e.g., to the ETV server 210' for streaming to the host platform 3 209. In processing step 530, following receipt of the content availability signal 529, the ETV application server module RN 210' generates and sends a P2P signal 531 to the ETV application server module R1 210 indicating that the playlist content is ready for streaming. In processing step 532, following the receipt of Playlist content ready signal 531, the ETV application server module R1 210 generates and sends a signal, e.g. a P2P signal 533, to the ETV application server RN 210' acknowledging the receipt of playlist content ready signal 531 and indicating that streaming of the content should be initiated in accordance with the playlist information shared by both of the ETV application servers 210, 210'. In processing steps 534 and 534', ETV application server RN 210' and ETV application server R1 210, generate and send signals 535 and 535' respectively, to their respective local Regional content servers (Regional content server 1 122 corresponding to ETV application server R1 210 and Regional content server 122' corresponding to ETV applications server RN 210') to initiate delivery of the content indicated in the shared set of playlist information. In some but not necessarily all embodiments, the content is delivered through the corresponding ETV application server 210, 210' which can modify it to include eBIF triggers and/or other information.

In steps 536 and 536', following receipt of signals 535 and 535', the Regional content server N 122' and the Regional content server 1 122, respectively, generate and send the requested playlist content, e.g. digital video, as signals 537 and 537' to their corresponding Host platforms 210, 210' resulting in a synchronized content delivery session. For example, Regional content server N 122' sends a playlist content 537 to the corresponding host platform 3 209 via ETV server 210' while regional content server 1 122 sends playlist content 537' to the corresponding host platform 1 208.

It is possible that while an interactive session is in progress, one of the participants may wish to add some content to the playlist, e.g. add a show, a video and/or a song and/or to alter the presentation by issuing a trick play command such as a fast forward, reverse, pause or skip command. The present invention supports capabilities by dynamic updating a set of playlist information, and one or more playlists based on the set of information, being used to control content delivery during in an interactive session. In an event when a user, e.g. user of host platform 1 208, issues a command to control the presentation, a playlist control signal 541 is sent in processing step 540, from the host platform 1 208 to the ETV application server R1 210. In steps 542 and 542', the ETV application server R1 210 and ETV application server RN 210' exchange playlist control signaling information indicated by signaling arrow 543. This signaling indicates the changes to the playlist to be made to implement the command received from the user of host platform 1 208. Following the exchange of the playlist control signaling information, the ETV application servers 210 and 210', generate and send signals 544 and 544' to their respective local regional content servers, e.g., Regional content server 1 122 and Regional content server N 122' respectively, to revise the playlist content as per the command received form the user of host platform 208. In processing steps 545 and 545 after receiving signals 544 and 544', the respective Regional content servers 122 and 122', revise and deliver playlist content in a synchronized manner according to the updated playlist information. The delivery of the content in accordance with the updated playlist information is indicated by signaling arrow 546 and 546' and, as in the case of the original content delivery may be by way of the ETV servers 210, 210'. The content delivered following issuance of the command may be, e.g., a fast forward data stream, some other trick play stream, or a stream of content including newly selected content to be presented. The presentation of the delivered content occurs in steps 547 and 547' which happen in a synchronized manner providing a sense of a common or shared presentation experience as part of the on-demand session originally initiated by the user of host platform 208

The content delivery and presentation process may continue until terminated by one of the users of the platforms 208, 209. During the content delivery and presentation process anyone of the session participants may issues a command that triggers modification of the playlist information and one or more playlists used to control the delivery of content to individual session participants.

FIG. 5C is a continuation of FIG. 5B and shows an example where the user of host platform 209, the invited party, can alter the delivery of content, e.g., by issuing a trick play command or other command. Thus, FIG. 5C shows the case where the playlist control signal is being generated and sent by the user of host platform 3 209, e.g., the invited party. In illustrated step 548, the user of host platform 3 209 enters a command into the STB 209, e.g., using a remote control, causing the host platform 209 to generated and send playlist control signal 549 to ETV application server 210'. The playlist control signal may be, e.g., a request for manipulation of the speed of content delivery, e.g. a fast-forward request, a rewind request, or a skip request. In steps 550 and 550', following the receipt of the playlist control signal 549 at the ETV application server 210', the ETV application server RN 210' and ETV application server R1 210 exchange playlist control signaling information as indicated by signaling arrow 551. Following the exchange of the playlist control signaling information, the ETV application servers 210' and 210, generate and send signals 552 and 552' to their respective local regional content servers, e.g., regional content server N 122' and Regional content server 1 122, respectively, to signal a change in playlist in order to implement the trick play command received for host platform 209. In processing steps 553 and 553' after receiving signals 552 and 552', the respective Regional content servers 122 and 122', revise and deliver content in a synchronized manner, e.g., according to the updated playlist information, as indicated by signaling arrows 554 and 554'. In steps 555 and 555' the content is presented to the users by host platform 1 208 and host platform 3 209, respectively.

While the content streaming is being shown as occurring from the regional content servers 122, 122' it should be appreciated that the functionality of an ETV application server and regional content server can, and in some embodiments is, implemented in a single device avoiding the need for different servers.

While described in the context of a video on demand system, it should be appreciated that the methods and apparatus of the present invention are not limited to the delivery of video content and can be used to support delivery of audio content and/or other types of information content which may be requested by an IP based CPE device.

In various embodiments system elements described herein are implemented using one or more modules which are used to perform the steps corresponding to one or more methods of the present invention, for example, presenting the user with available content information, receiving a user input indicating a content request, estimating delivery time information, selecting a source for content, controlling the copying of content between servers, Each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A content delivery method, the method comprising:
operating a first content server to provide content as part of an on-demand content delivery session, to a first platform;
operating a first control device, through which said content is delivered to the first platform during said on-demand content delivery session, to send an invitation signal to a second control device to trigger presentation of an invitation to join the on-demand content delivery session to an invited party, said first control device being in a content delivery path used to deliver content from said first content delivery server to said first platform;
operating said second control device to identify a second content server from which said content can be provided to a second platform corresponding to said invited party, said first content server and said second content server being located at different locations;
operating the second control device to communicate to said first control device a duration of an expected delay associated with retrieval of said content, said expected delay corresponding to an amount of time required by said second content server to retrieve said content from a third content server, said third content server being different from said first content server;
modifying a playlist used to control delivery of content to said first platform to take into account the amount of time required by said second content server to retrieve said content from the third content server; and
operating said second content server to provide said content to said second platform in synchronization with the supply of said content from the first content server to said first platform.

2. The content delivery method of claim 1,
wherein the method further comprises:
operating the first control device to insert into an on-demand content stream, including said content, control information used to trigger presentation of an invite option to a user of said first platform;
operating the first control device to process a response to said invite option;
wherein said step of operating the first control device to send the invitation signal to the second control device is performed in response to said invite option;
and
wherein said on-demand content delivery session is ongoing at the time said control information is inserted.

3. The method of claim 2, further comprising:
prior to performing said step of operating the first control device to insert into an on-demand content stream, including said content, control information used to trigger presentation of an invite option to a user of said first platform, performing the step of:
operating said first control device to receive a signal to initiate an on-demand content delivery session from said first platform, said controlling content delivery including initiating the content delivery in response to said signal to initiate an on-demand content delivery session.

4. The method of claim 2, further comprising:
receiving a response to the invitation signal; and
inserting, into the on-demand content stream being delivered to said first platform, information indicating the resulting response to the invitation signal sent to the another device.

5. The method of claim 4,
wherein said invite option includes a presentation of possible parties to join the on-demand content delivery session; and
wherein said response to said invite option includes information identifying a party to be invited.

6. The method of claim 5, wherein said presentation of possible parties includes a display of avatars corresponding to different people whom the user may select to invite to join the on-demand session.

7. The method of claim 2 wherein operating the first control device to process a response to said invite option includes using information from a friend list corresponding to the first platform from which the response to said invite option was received to identify an invited party and to determine an address to which a message or a signal can be sent to contact the invited party.

8. The method of claim 2,
wherein said first and second control devices are application servers, the method further comprising:
identifying a control server corresponding to the invited party, said identified control server being said second control device.

9. The method of claim 1, wherein said on-demand content being delivered to said first platform is video content.

10. The method of claim 1, further comprising:
operating the first control device to provide playlist information to the second control device, said playlist information including information used to control presentation of the content to said invited party in a synchronized manner with the presentation of the content to a user of the first platform.

11. The method of claim 10, wherein said first content server corresponds to a first geographic region and said second content server is in a second geographic region, said first and second geographic regions being different geographic regions, said first and second platforms being geographically separated from one another.

12. The method of claim 1, further comprising:
operating said second control device to communicate to said first communications device when said content is available at said second content server for delivery to said second platform.

13. The method of claim 12, further comprising:
after said second control device notifies said first control device that said content is available for delivery to said second platform:
operating the first control device to signal said first content server to deliver playlist content to said first platform; and
operating the second control device to signal said second content server to deliver playlist content to said second platform.

14. The method of claim 12, further comprising:
operating the first control device to receive a playlist control signal from said first platform;
operating the first control device to communicate a playlist control signal to said second control device;
operate said first control device to send a first revise delivery control signal to the first content server to revise content delivery in accordance with the playlist control signal from said first platform; and operate the second control device to send a second revise delivery control signal to said second content server to revise content delivery in accordance with the playlist control signal from said second platform.

15. The method of claim 1, wherein
operating said second content server to provide said content to said platform in synchronization with the supply of said content from the first content server to said first platform includes:
operating said second content server to supply said content via said second control device to said second platform.

16. A content delivery system comprising:
a first platform for presenting content;
a second platform for presenting content;
a first content server that provides content as part of an on-demand content delivery session, to the first platform;
a first control device coupled to said first content server and said first platform, said first control device being in a content delivery path used to deliver content from said first content delivery server to said first platform;
a second content server;
a second control device coupled to said first control device,
wherein said first control device sends an invitation signal to the second control device to trigger presentation of an invitation to join the on-demand content delivery session to an invited party using said second platform in response to a signal from said first platform inviting said invited party to join said on-demand content delivery session;
wherein said second control device identifies said second content server from which said content can be provided to the second platform and communicates to said first control device a duration of an expected delay associated with retrieval of said content, said expected delay corresponding to an amount of time required by said second content server to retrieve said content from a third content server, said third content server being different from said first content server;
wherein said first control device further modifies a playlist used to control delivery of content to said first platform to take into account the amount of time required by said second content server to retrieve said content from the third content server; and
wherein said second control device further controls said second content server to provide said content to said second platform in synchronization with the supply of said content from the first content server to said first platform.

17. The system of claim 16, wherein said second control device communicates to said first control device a duration of an expected delay associated with retrieval of said content from the second content server.

18. The system of claim 17, further comprising:
a third content server;
wherein said first control device is a first application server;
wherein said second control device is a second application server;
wherein said first content server is a first regional content server;
wherein said second content server is a second regional content server which corresponds to a different geographic region than said first content server; and
wherein said expected delay corresponds to an amount of time required by said second content server to retrieve said content from the third content server, said third content server being different from said first content server.

* * * * *